J. GOODMAN.

Telephone.

No. 9,673. Reissued April 19, 1881.

WITNESSES

Willetta Anderson

Philip C. Masi.

INVENTOR

John Goodman by Anderson & Smith his ATTORNEYS

UNITED STATES PATENT OFFICE.

JOHN GOODMAN, OF LOUISVILLE, KENTUCKY.

TELEPHONE.

SPECIFICATION forming part of Reissued Letters Patent No. 9,673, dated April 19, 1881.

Original No. 234,978, dated November 30, 1880. Application for reissue filed January 19, 1881.

*To all whom it may concern:*

Be it known that I, JOHN GOODMAN, of Louisville, in the county of Jefferson and State of Kentucky, have invented certain new and useful Improvements in Telephones; and I do hereby declare the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
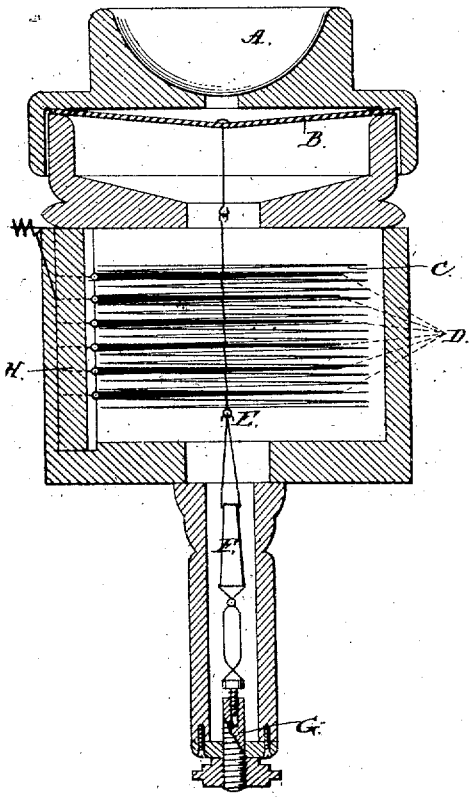
Figure 2:
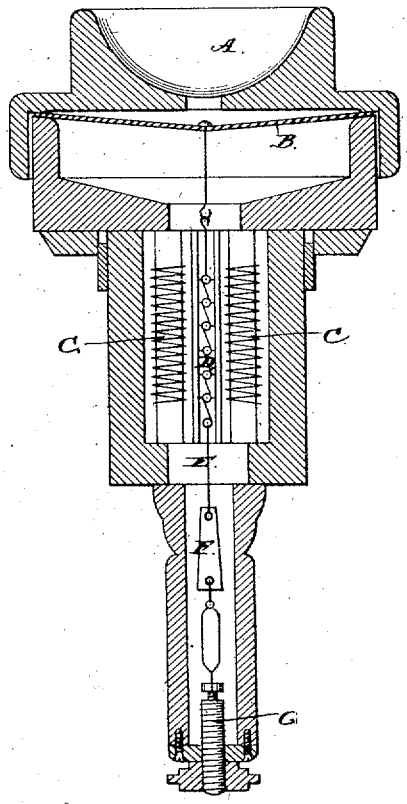
Figure 3:
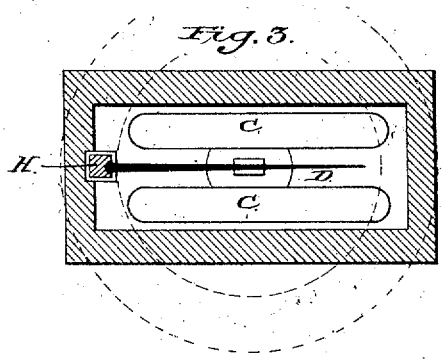

Figure 1 is a longitudinal section. Fig. 2 is a longitudinal section at right angles to Fig. 1. Fig. 3 is a cross-section.

This invention has relation to telephone-receivers; and it consists in the construction and novel ~~arrangement, in combination, of a~~ magnet or series of magnets and a flattened helix or coil of wire so related to each other that when a current of electricity is passed through the coil the magnet or magnets will have a tendency to assume a position at right angles to the direction of the current; and, in connection therewith, it consists also of elastic devices exerting pressure on the magnets, and tending to maintain them in a position approximating parallelism with the helix, all as hereinafter shown and described.

In the accompanyings drawings, the letter D represents the magnets, which, in this instance, are long and tongue-like in form, and are fastened at intervals by one end to the post H, which is located at the side of the case near one end of the helix or helices C. In this construction two flattened helices are employed, their long sides being parallel with each other, and one being a left-hand while the other is a right-hand helix. These helices are designed to affect the magnets situated between them in the same manner that a single coil would if it surrounded them, and a single coil may therefore be employed with like effect. The magnets D extend between the coils C, and parallel to the wires thereof, in the manner shown in the drawings, and the extremities of the magnets opposite to the post H are left free to move.

B indicates the resonator or sounding-diaphragm, made of thin metal or other suitable material.

A represents the ear-piece over the resonator, and E the cord extending from the resonator to the spring F, which is connected to the core at the opposite end from the resonator. The cord E is connected in its course to the middle portion of each of the magnets D, which are therefore, in a manner, strained or held in tension between two elastic devices—the resonator and the spring F—which tend to hold them parallel with the wires of the coils C. This tension may be regulated by means of an adjustable screw, G, to which the spring F is connected.

With this instrument sound is reproduced simply by variations in the force of the electric current, these variations varying from the full ~~force thereof down to zero. If the instrument~~ be applied to the ear and the circuit suddenly closed by metallic connections, the current in the coil will overcome the tension of the spring and the points of the magnets D will be deflected; and this movement being propagated to the diaphragm or resonator by means of the cord E, this diaphragm will be suddenly relaxed or retracted, (according to the direction of the current,) as if struck by a blow, and a short and sharp sound or click will be heard. If, however, one of the connections be a slightly-roughened surface and the other made of hard steel, when the latter is drawn slowly over the former, a dull, rasping sound will be heard; but if the passage of the one over the other be made by a quick movement, the vibrations of the diaphragm will cause a continuous sound on a high key, resembling a shriek. These illustrations represent the extremes caused by making or breaking the circuit, and between them will be readily given forth by this instrument every degree of character and intensity of sound caused by the variations in the force of the current. Every variation in intonation and pitch in the sound depends upon the character and frequency of the vibrations of the diaphragm; and these in turn, in this instrument, are due to variations in the force of the current which passes through the coils by which the magnets are deflected.

In this instrument, instead of using two helices, a single coil may be employed, and the magnet or magnets related to the external surface of one side of it; or the magnet or magnets may be placed within the coil longitudinally.

Instead of using an extraneous spring or elastic band to hold the magnets in parallel relation with the wire of the helices, the magnets themselves may be made in part flexible or elastic, so as to constitute a spring and magnet in one piece.

When the magnets D are situated and restrained as above described, and a current of electricity is passed through the coils, the magnets will be deflected toward a position at right angles to the length of the coils to an extent in proportion inversely to the strength of the springs and directly to the strength of the current. If the current is steady, the magnets will remain stationary at a point where the antagonizing forces exerted by the elastic pressure on the one hand and the electricity on the other are *in equilibrio;* but if the current be intermittent or variable in strength during the moments of its cessation or weakness, the elastic pressure will draw the magnets toward a parallelism with the conductor, and during its action or increment it will prevail over the elastic pressure and cause more or less departure of the magnets from this parallelism, thus throwing them into vibrations, which, if of proper frequency and if imparted to a diaphragm or resonator, will produce sound.

In using this receiver, any transmitter which varies the form of the electric current sufficiently will answer.

Having described my invention, what I claim, and desire to secure by Letters Patent, is—

1. In a telephone-receiver, the combination of a conductor, a vibratory magnet parallel to the conductor, a diaphragm, and devices whereby movements of the magnet are conveyed to the diaphragm, substantially as described.

2. In an electric telephone, as a means of transferring electric into acoustic action, the combination, with a conductor and diaphragm, of a magnet parallel to the conductor and devices for transferring movements of the magnet to the diaphragm, whereby the tendency of the magnet to assume a position at right angles to the conductor when a current of electricity is passed through the latter gives motion to the diaphragm, as set forth.

3. In a telephone-receiver, the combination, with a helix or conductor and a vibratory magnet parallel therewith, and tending to assume a position at right angles thereto when the conductor is electrified, of elastic connections designed to hold the magnets in a position approximating parallelism with the conductor, substantially as specified.

4. In a telephone-receiver, the combination, with the conductor or helices and the vibratory magnets arranged parallel therewith, of the resonator or diaphragm connected mechanically with the magnets, and the spring or elastic device tending to hold the magnets parallel with the helices and in strained connection with the resonator, substantially as specified.

In testimony whereof I affix my signature in presence of two witnesses.

JOHN GOODMAN.

Witnesses:
THEODORE D. DAVIS,
W. T. MCDOWELL.